United States Patent
Forster (10) Patent No.: US 10,320,054 B2
(45) Date of Patent: Jun. 11, 2019

(54) RFID TAGS DESIGNED TO WORK ON DIFFICULT SUBSTRATES

(71) Applicant: Avery Dennison Retail Information Services, LLC, Westborough, MA (US)

(72) Inventor: Ian J. Forster, Chelmsford (GB)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 85 days.

(21) Appl. No.: 15/337,494

(22) Filed: Oct. 28, 2016

(65) Prior Publication Data
US 2018/0123220 A1    May 3, 2018

(51) Int. Cl.
*H01Q 1/22* (2006.01)
*G06K 19/077* (2006.01)
*H01Q 1/38* (2006.01)
*H01Q 9/04* (2006.01)
*G06K 19/07* (2006.01)

(52) U.S. Cl.
CPC ........... *H01Q 1/2225* (2013.01); *G06K 19/07* (2013.01); *G06K 19/07771* (2013.01); *G06K 19/07773* (2013.01); *H01Q 1/38* (2013.01); *H01Q 9/04* (2013.01)

(58) Field of Classification Search
CPC .. G06K 19/07773; H01Q 1/2225; H01Q 1/38; H01Q 9/04
See application file for complete search history.

(56) References Cited

U.S. PATENT DOCUMENTS

| | | | |
|---|---|---|---|
| 5,779,839 A | 7/1998 | Tuttle et al. | |
| 6,100,804 A * | 8/2000 | Brady | G06K 19/07749 257/678 |
| 6,111,303 A | 8/2000 | Launay | |
| 6,262,692 B1 * | 7/2001 | Babb | B60C 23/0493 343/895 |
| 6,329,213 B1 | 12/2001 | Tuttle et al. | |
| 7,315,248 B2 | 1/2008 | Egbert | |
| 7,612,676 B2 | 11/2009 | Yuen et al. | |
| 7,741,972 B2 | 6/2010 | Hashimoto et al. | |
| 8,120,492 B2 | 2/2012 | Scharfeld et al. | |

(Continued)

FOREIGN PATENT DOCUMENTS

WO    02099764    12/2002

OTHER PUBLICATIONS

International Search Report and Written Opinion dated Feb. 16, 2018 of ISA/EPO Prepared for PCT/US2017/058704 filed Oct. 27, 2017.

*Primary Examiner* — Tho G Phan
(74) *Attorney, Agent, or Firm* — Avery Dennison Retail Information Services, LLC (57) ABSTRACT

An RFID tag device is disclosed that is designed to operate on difficult substrates, such as dielectric surfaces with high loss, organic material surfaces, or metallic surfaces. The RFID tag device comprises an RFID antenna structure formed on one side of a thermoplastic substrate component with an RFID chip coupled to it in a roll to roll process. The substrate component is then deformed into a series of cavities with the RFID antenna structure within the cavities. Specifically, the RFID antenna structure is positioned fully on a top surface of the cavity, or positioned partially in a top and partially on an edge/bottom of the cavity.

16 Claims, 8 Drawing Sheets

(56) References Cited

U.S. PATENT DOCUMENTS

| | | | |
|---|---|---|---|
| 8,325,047 B2* | 12/2012 | Marur | G06K 19/07749 |
| | | | 235/492 |
| 9,159,015 B2* | 10/2015 | Bielmann | G06K 19/07749 |
| 2006/0091225 A1 | 5/2006 | Forster et al. | |
| 2006/0250242 A1* | 11/2006 | Drapala | G06K 19/07718 |
| | | | 340/572.1 |
| 2007/0141760 A1 | 6/2007 | Ferguson et al. | |
| 2008/0122631 A1 | 5/2008 | Kodukula et al. | |
| 2010/0079286 A1 | 4/2010 | Phaneuf | |
| 2011/0148737 A1* | 6/2011 | Kang | H01Q 1/2225 |
| | | | 343/904 |
| 2012/0222290 A1 | 9/2012 | Forster | |
| 2013/0062875 A1 | 3/2013 | Le Loarer et al. | |
| 2013/0207874 A1 | 8/2013 | Hecker et al. | |
| 2015/0278671 A1* | 10/2015 | Martin | G06K 19/027 |
| | | | 235/492 |

\* cited by examiner

RFID TAGS DESIGNED TO WORK ON DIFFICULT SUBSTRATES

BACKGROUND

The present invention relates generally to a radio-frequency identification (RFID) tag device that is designed to operate on difficult substrates. Specifically, the RFID tag is created in a roll to roll process with a series of cavities formed in the substrate to establish a separation between the antenna and the difficult substrate.

Radio-frequency identification ("RFID") is the use of electromagnetic energy ("EM energy") to stimulate a responsive device (known as an RFID "tag" or transponder) to identify itself and in some cases, provide additionally stored data. RFID tags typically include a semiconductor device commonly called the "chip" on which are formed a memory and operating circuitry, which is connected to an antenna. Typically, RFID tags act as transponders, providing information stored in the chip memory in response to a radio frequency ("RF") interrogation signal received from a reader, also referred to as an interrogator. In the case of passive RFID devices, the energy of the interrogation signal also provides the necessary energy to operate the RFID device.

RFID tags may be incorporated into or attached to articles to be tracked. In some cases, the tag may be attached to the outside of an article with adhesive, tape, or other means and in other cases, the tag may be inserted within the article, such as being included in the packaging, located within the container of the article, or sewn into a garment. The RFID tags can contain a chip that is manufactured with a unique identification number which is typically a simple serial number of a few bytes with a check digit attached. The user cannot alter this serial/identification number and manufacturers guarantee that each serial number is used only once. This configuration represents the low cost end of the technology in that the RFID tag is read-only and it responds to an interrogation signal only with its identification number.

Alternatively, the RFID chips included in the RFID tag may include memory that can be written to after manufacture, so information about the product that the RFID tag is attached to may be programmed in at other locations, such as at the point of manufacture of the item or at a location where a visual feature, such as a barcode, pattern or human readable is printed, allowing said information to be associated with the printed information. In this case, the RFID tag can respond to the interrogation signal with all or part of the programmed information as well as a unique number if that has been programmed into a read only memory structure at point of manufacture.

The RFID tag, depending on what type of chip is used, may be associated with an item in a database using the unique number, or by the relationship between the programmed data and the item. The objective of the tag is to associate it with an article or multiple articles associated in a bag or other container. This information may be used at one or more location depending on the use case; typical examples would be in a manufacturing facility, a transport vehicle, in a shop, a health care facility, a pharmacy storage area, or other environment. It will be appreciated that the use of the data in the RFID tag and where it is accessed is dependent on what the tag is to be used for. For example, tracking the articles through the facility can assist in generating more efficient dispensing and inventory control systems as well as improving work flow in a facility. This results in better inventory control and lowered costs. It is also desirable to develop accurate tracking, inventory control systems, and dispensing systems so that RFID tagged devices and articles may be located quickly should the need arise, and may be identified for other purposes, such as expiration dates or recalls.

Many RFID tags used today are passive in that they do not have a battery or other autonomous power supply and instead, must rely on the interrogating energy provided by an RFID reader to provide power to activate the tag. Passive RFID tags require an electromagnetic field of energy of a certain frequency range and certain minimum intensity in order to achieve activation of the tag and transmission of its stored data. Another choice is an active RFID tag; however, such tags require an accompanying battery to provide power to activate the tag, thus increasing the expense and the size of the tag and making them undesirable for use in a large number of applications.

Depending on the requirements of the RFID tag application, such as the physical size of the articles to be identified, their location, and the ability to reach them easily, tags may need to be read from a short distance or a long distance by an RFID reader. Furthermore, the read range (i.e., the range of the interrogation and/or response signals) of RFID tags is also limited.

Furthermore, when the RFID tags are attached to a difficult substrate, such as dielectrics with high loss, for example, organic materials like meat, and metallic surfaces and/or conductive surfaces, typically a standard RFID tag cannot be read as efficiently as one placed on other materials such as clothing, corrugate boxes etc. This is a significant problem given that in many commercial applications it is desirable to apply the RFID tag to a difficult substrate, such as dielectrics with high loss, and metallic or other types of conductive surfaces. In order for an RFID tag to work (operate) on these difficult substrates, performance is greatly increased by establishing a separation between the substrate and the antenna structure. This separation must then be filled with a suitable dielectric, such as foam or plastic, or air. What is needed therefore is an RFID tag device and/or system that allows the RFID tag to operate in proximity to difficult substrates, such as dielectrics with high loss, and/or metal surfaces or other types of conductive surfaces, by creating a separation between the substrate and the antenna structure.

The present invention discloses an RFID tag device that is designed to operate on difficult substrates, such as dielectric surfaces with high loss, organic material surfaces, or metallic surfaces, and an associated manufacturing method to reduce cost and allow efficient production. The RFID tag device comprises an RFID antenna structure formed on one side of a thermoplastic substrate component with an RFID chip coupled to it. The substrate component is then deformed into a series of cavities with the RFID antenna structure within the cavities to create a separation between the substrate and the RFID antenna structure.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises an RFID tag device that is designed to operate on difficult substrates, such as dielectric surfaces with high loss, organic material surfaces, or metallic surfaces, etc. The RFID tag device comprises an RFID antenna structure which can be a monopole, dipole, patch or slot antenna. The RFID antenna structure is formed on one side of a thermoplastic substrate component with an RFID chip coupled to it in a roll to roll process. The substrate component is then deformed into a series of cavities with the RFID antenna structure within the cavities. Specifically, the RFID antenna structure is positioned fully on a top surface of the cavity, or positioned partially in a top and partially on an edge/bottom of the cavity.

In a preferred embodiment, the bottom surface of the cavity can be covered with a base layer. The base layer is typically a conductive material such as foil. Additionally, a portion of the RFID antenna structure can extend onto the rim of the cavity. More than one portion of the RFID antenna structure can also extend onto the rim of the cavity, creating multiple coupling points to the substrate. Further, in one embodiment, the base layer is smaller than the rim area of the plastic cavity, such that one or more of the extensions of the RFID antenna structure extend outside the base layer. Additionally, the RFID antenna structure can be coupled at both ends to the substrate. And, the thermoplastic substrate component can be a corrugated substrate to allow the RFID tag to better conform to curved surfaces.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses an RFID tag device is disclosed that is designed to operate on difficult substrates, such as dielectric surfaces with high loss, organic material surfaces, or metallic surfaces. The RFID tag device comprises an RFID antenna structure formed on one side of a thermoplastic substrate component with an RFID chip coupled to it in a roll to roll process. The substrate component is then deformed into a series of cavities with the RFID antenna structure within the cavities. Specifically, the RFID antenna structure is positioned fully on a top surface of the cavity, or positioned partially in a top and partially on an edge/bottom of the cavity.

Figure 1A:
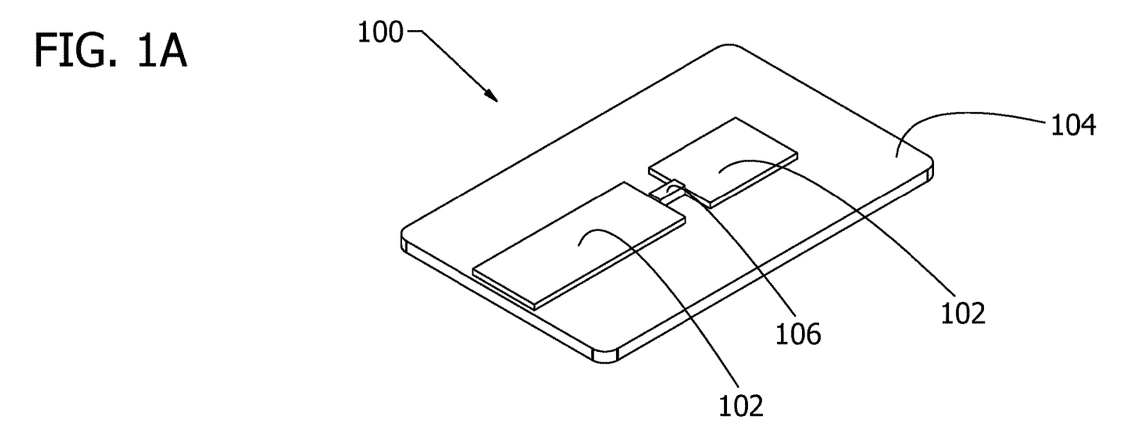
FIG. 1A illustrates a top perspective view of the RFID antenna structure on a thermoplastic substrate component in accordance with the disclosed architecture.
Figure 1B:
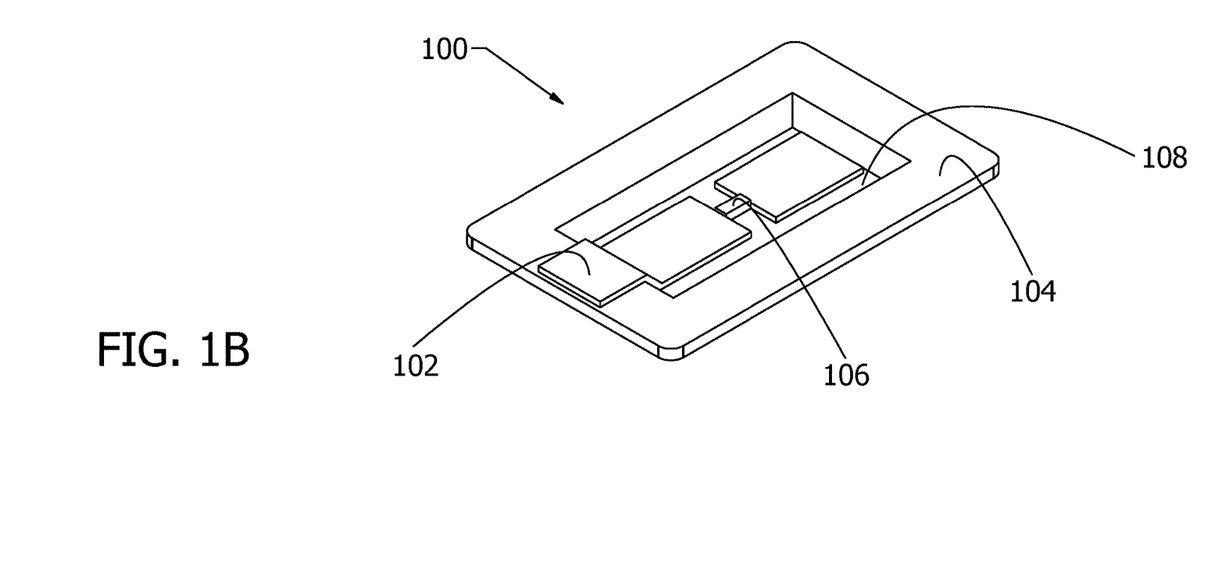
FIG. 1B illustrates a top perspective view of the RFID antenna structure on a thermoplastic substrate component after deformation in accordance with the disclosed architecture.

Referring initially to the drawings, FIGS. 1A-B illustrate the RFID tag 100 comprising an RFID antenna structure 102 on a thermoplastic substrate component 104 before and after deformation. The RFID tag 100 is designed to operate on difficult substrate surfaces, such as dielectric surfaces with high loss, organic material surfaces (i.e., meat), and metallic surfaces. The RFID antenna structure 102 is formed on one side of the thermoplastic substrate component 104 with an RFID chip 106 coupled to it.

The RFID antenna structure 102 can comprise any suitable antenna as is known in the art, such as, but not limited to, a monopole antenna, a dipole antenna, a patch antenna, a slot antenna, or other suitable forms of antennas. The RFID antenna structure 102 can be formed from a number of suitable materials, such as metal foil, copper or aluminum, a vapor deposited metal layer, or a conductive ink, or any other suitable material as is known in the art.

The RFID antenna structure 102 can be any suitable size, shape, and configuration as is known in the art without affecting the overall concept of the invention. One of ordinary skill in the art will appreciate that the shape and size of the antenna structure 102 as shown in FIG. 1 is for illustrative purposes only and many other shapes and sizes of the antenna structure 102 are well within the scope of the present disclosure. Although dimensions of the antenna structure 102 (i.e., length, width, and height) are important design parameters for good performance, the antenna structure 102 may be any shape or size that ensures optimal performance and sensitivity during use.

Specifically, the RFID tag 100 comprises a thermoplastic substrate component 104 or any other suitable material as is known in the art. An RFID antenna structure 102 is then formed on one side of the thermoplastic substrate component 104 with an RFID chip 106 coupled to it. Typically, the RFID antenna structure 102 is formed on the thermoplastic substrate 104 in a roll to roll process, or any other suitable process as is known in the art. As a final stage, the thermoplastic substrate component 104 is deformed into a series of cavities 108 with either the RFID antenna structure 102 positioned fully on the top surface or partially in the top and partially on the edge/bottom of the cavity 108.

Specifically, the thermoplastic substrate 104 comprises a first side and a second side, and the RFID antenna structure 102 is formed on the first side of the thermoplastic substrate 104 with an RFID chip 106 coupled to it. The second side of the substrate 104 is then placed over an aperture which has a vacuum applied to it. The substrate 104 is then heated to soften the plastic, at which point the material of the substrate 104 is pulled into the aperture, forming a blister (or cavity 108) with the RFID antenna structure 102 on it. The RFID antenna structure 102 can be positioned fully on the top surface or partially in the top and partially on the edge/bottom of the cavity 108. Although vacuum forming is the specified method of forming the cavity type structure, other suitable methods can be employed, such as extrusion, injection molding, casting, mechanical or laser milling, or any other suitable method can be used to form the cavity.

Figure 6A:
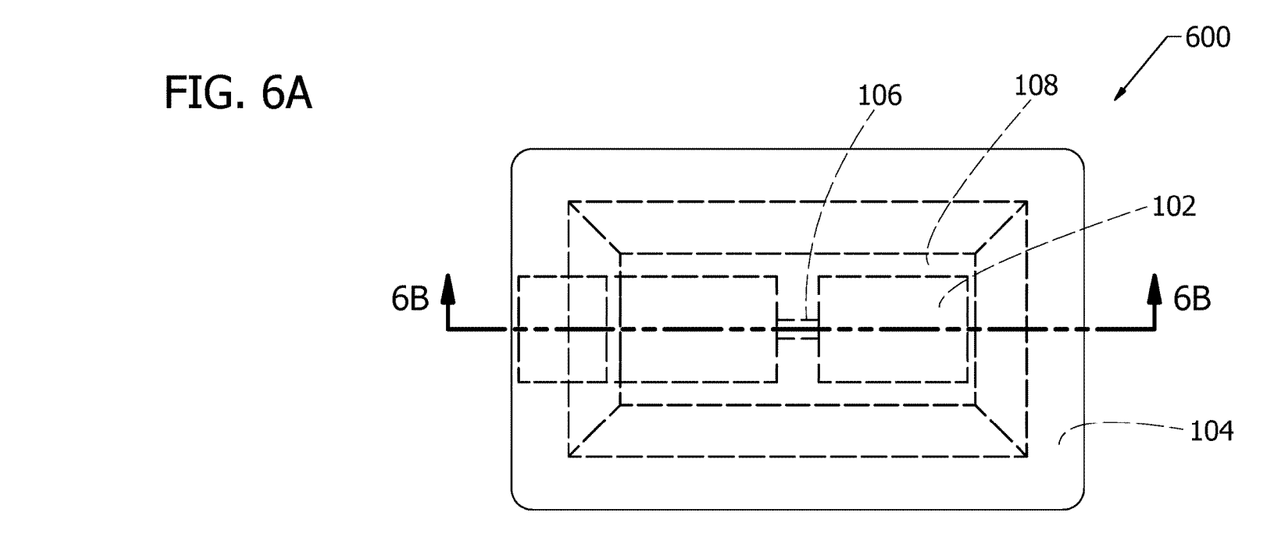
FIG. 6A illustrates a top perspective view of the RFID antenna structure wherein the cavity has a base layer applied in accordance with the disclosed architecture.

Furthermore, the bottom surface of the cavity 108 can be covered with a base layer 114 (as shown in FIG. 6A), which is typically a conductive material, such as aluminum foil or conductive ink, or any other suitable material. The base layer 114 sits between the RFID antenna structure 102 and the thermoplastic substrate 104. The base layer 114 can be added to all embodiments of the RFID tag 100 and provides a modified coupling to the thermoplastic substrate 104 when applied.

Figure 2A:
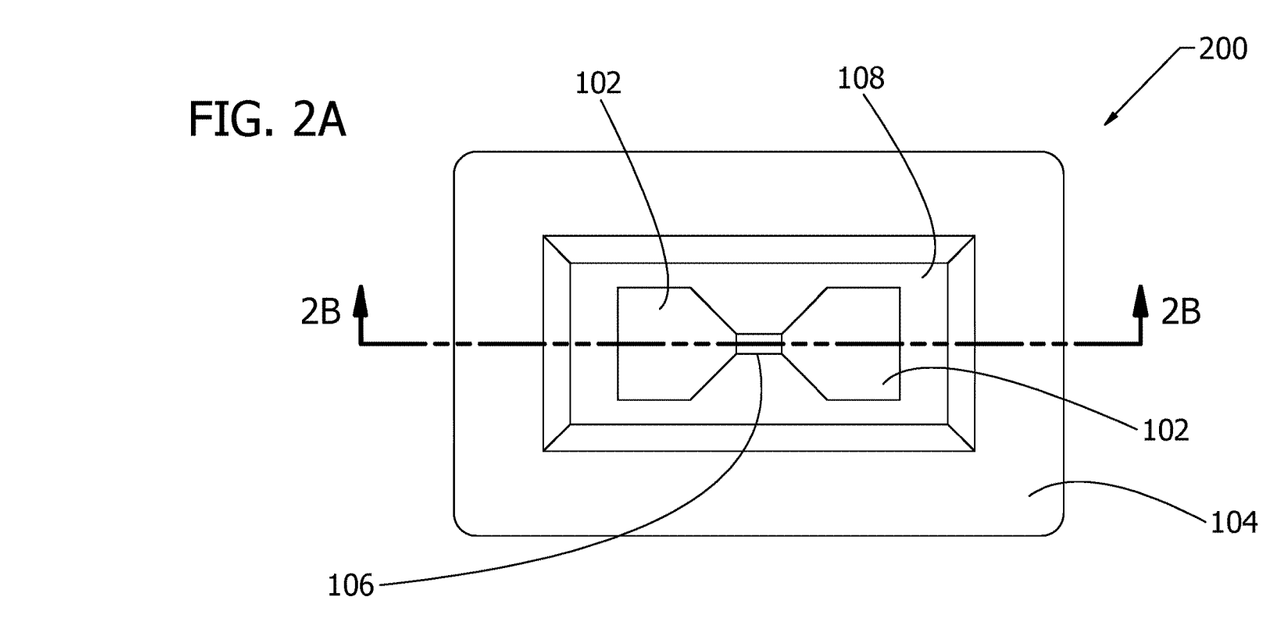
FIG. 2A illustrates a top perspective view of the RFID antenna structure within the top part of a cavity in accordance with the disclosed architecture.
Figure 2B:
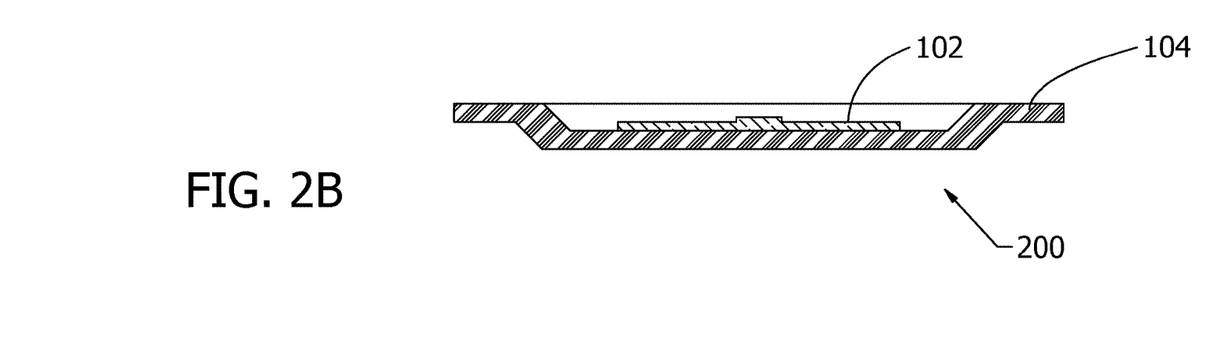
FIG. 2B illustrates a sectional view of the structure of FIG. 2A at cut line 2B-2B.
Figure 3A:
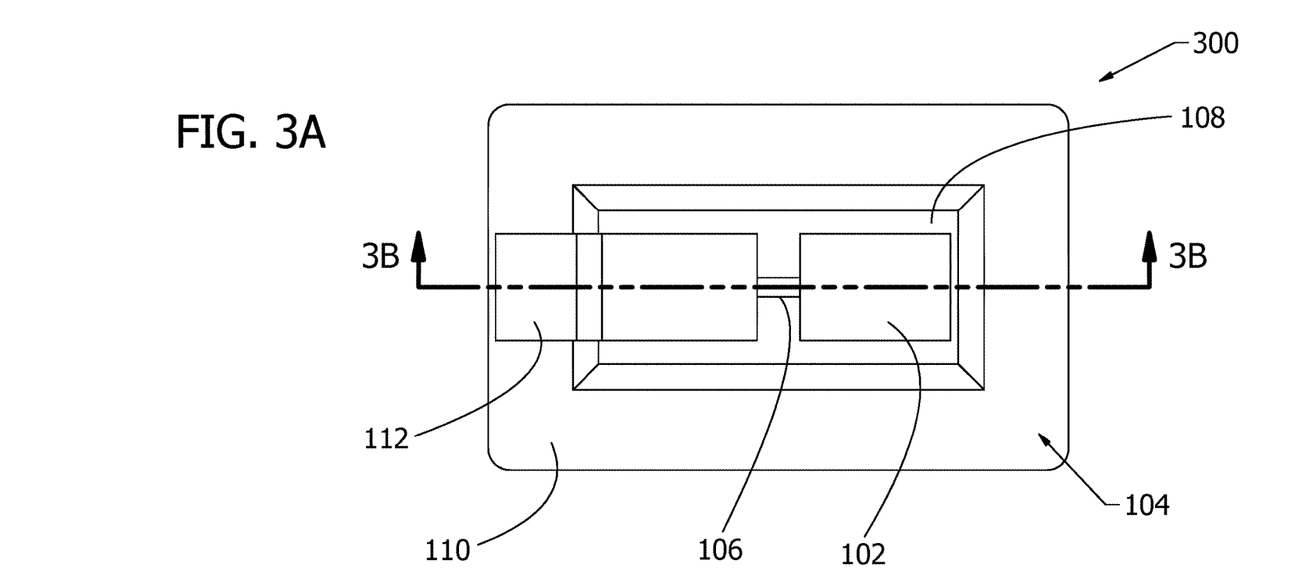
FIG. 3A illustrates a top perspective view of the RFID antenna structure extended onto a rim of the cavity in accordance with the disclosed architecture.
Figure 3B:
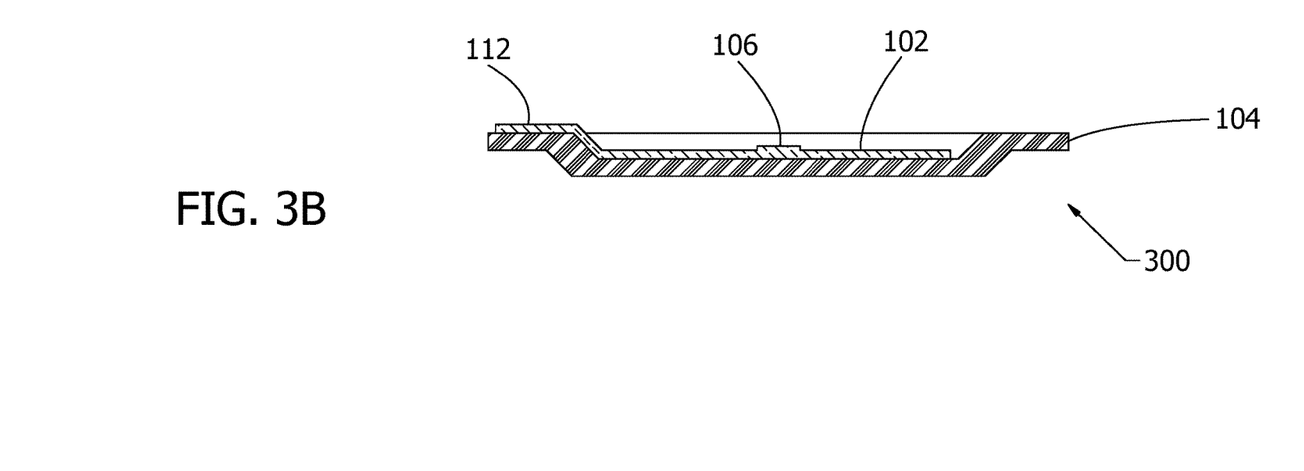
FIG. 3B illustrates a sectional view of the structure of FIG. 3A at cut line 3B-3B.

As illustrated in FIGS. 2A-B, the RFID antenna structure 102 is shown as a dipole or patch type antenna that is positioned entirely in the top part of the cavity 108 (shown in FIGS. 2A-B as 200). As shown, the RFID antenna structure 102 is not in contact with the thermoplastic substrate component 104 under the RFID tag 100. With reference now to FIGS. 3A-B, there is illustrated an RFID tag 100 wherein a portion 112 of the RFID antenna structure 102 is extended onto the rim 110 of the cavity 108 (shown in FIGS. 3A-B as 300). The area of the RFID antenna structure 102 on the rim 110 is coupled to the substrate material 104 under the RFID tag 100. For a monopole or patch type antenna, when the surface under the device is a conductor, this provides a ground plane; without a conductor the antenna would be considered as a form of a dipole antenna.

Figures 4A, 4B:
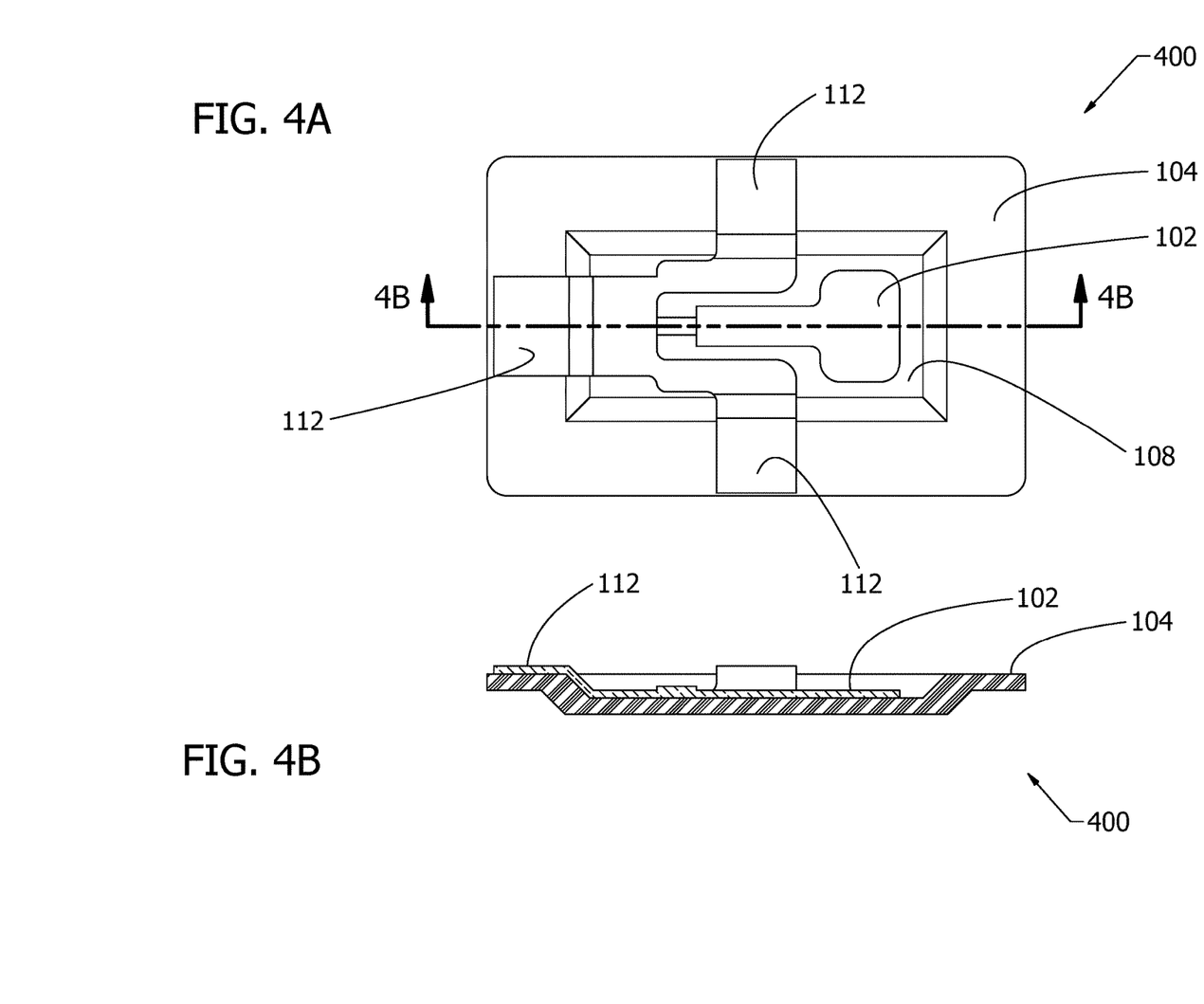
FIG. 4A illustrates a top perspective view of the RFID antenna structure extended onto the rim of the cavity at a number of places in accordance with the disclosed architecture.
FIG. 4B illustrates a sectional view of the structure of FIG. 4A at cut line 4B-4B.

With reference now to FIGS. 4A-B, there is illustrated an alternative embodiment wherein a portion 112 of the RFID antenna structure 102 is extended onto the rim at a number of places (shown in FIGS. 4A-B as 400), which controllably increases the coupling to the substrate 104 under the RFID tag 100, as there are multiple coupling points to the substrate 104 for the monopole or patch type antenna.

Figure 5A:
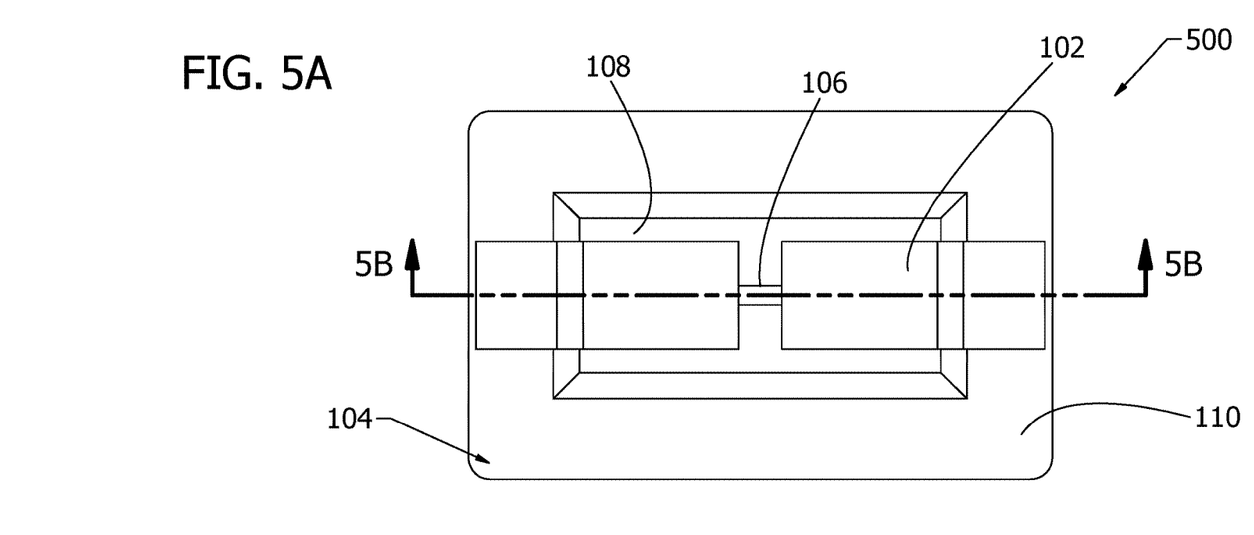
FIG. 5A illustrates a top perspective view of the RFID antenna structure coupled at both ends to the thermoplastic substrate in accordance with the disclosed architecture.
Figure 5B:
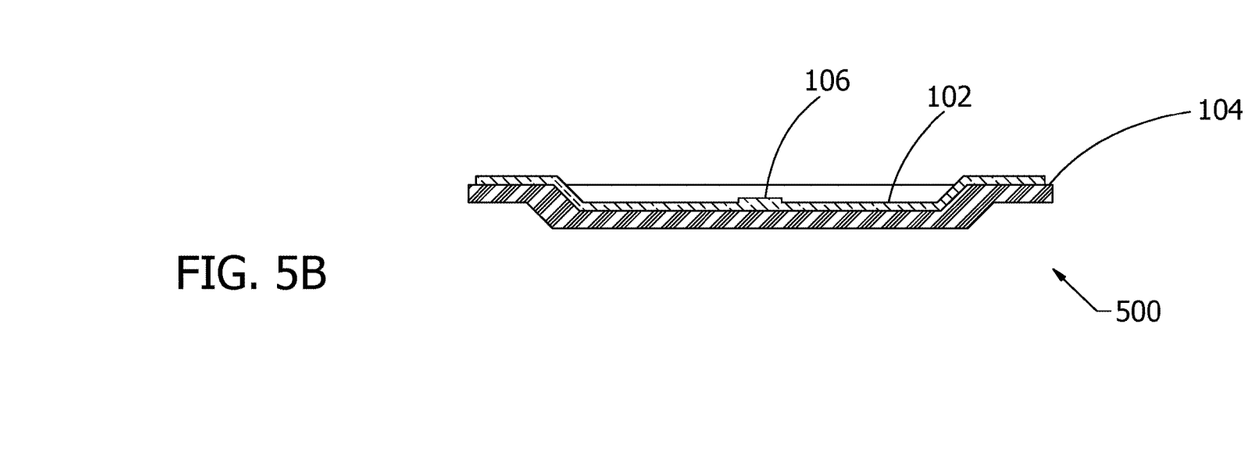
FIG. 5B illustrates a sectional view of the structure of FIG. 5A at cut line 5B-5B.
Figure 6B:
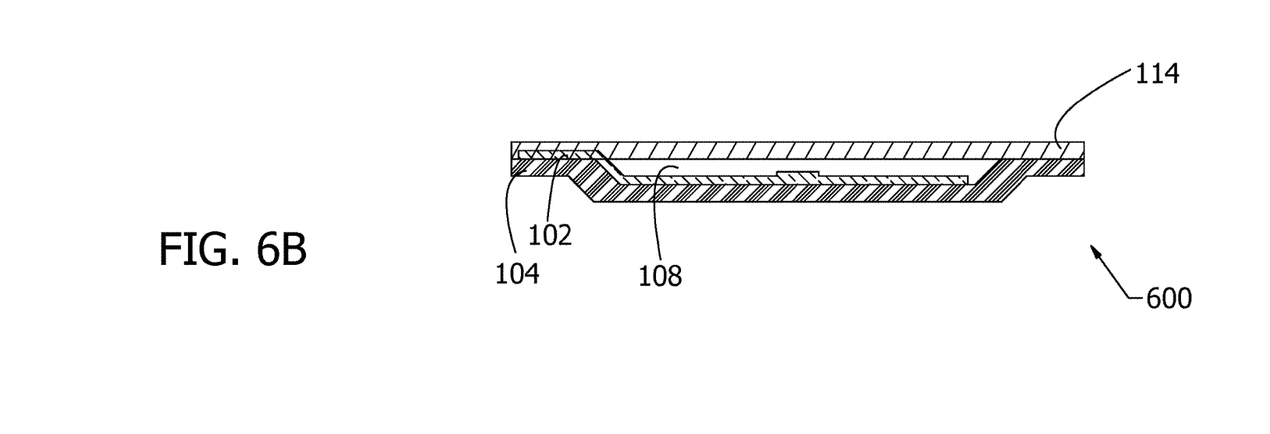
FIG. 6B illustrates a sectional view of the structure of FIG. 6A at cut line 6B-6B.

FIGS. 5A-B illustrate an alternative embodiment of the RFID antenna structure 102, wherein the dipole or patch type antenna is coupled at both ends to the substrate 104 (shown in FIGS. 5A-B as 500). With reference now to FIGS. 6A-B, there is illustrated an alternative embodiment wherein the cavity 108 has a base layer 114 applied (shown in FIGS. 6A-B as 600). The base layer 114 sits between the antenna 102 and substrate 104. One common form of base layer 114 would be a conductor, such as aluminum foil or a conductive ink, or a metal or plastic base layer. This conductor would act as a ground plane but which does not limit the invention. The base layer 114 can be added to all of the RFID tag structures 100 disclosed in FIGS. 1-5, and provides a modified coupling to the substrate 104 when applied.

Figure 7A:
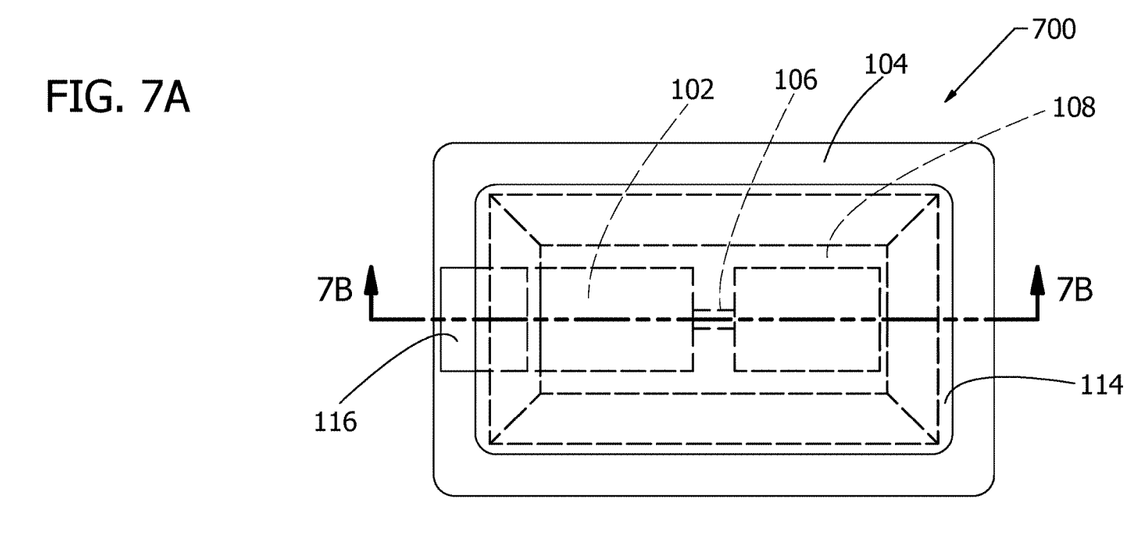
FIG. 7A illustrates a top perspective view of the RFID antenna structure wherein the base layer is smaller than the rim area of the cavity in accordance with the disclosed architecture.
Figure 7B:
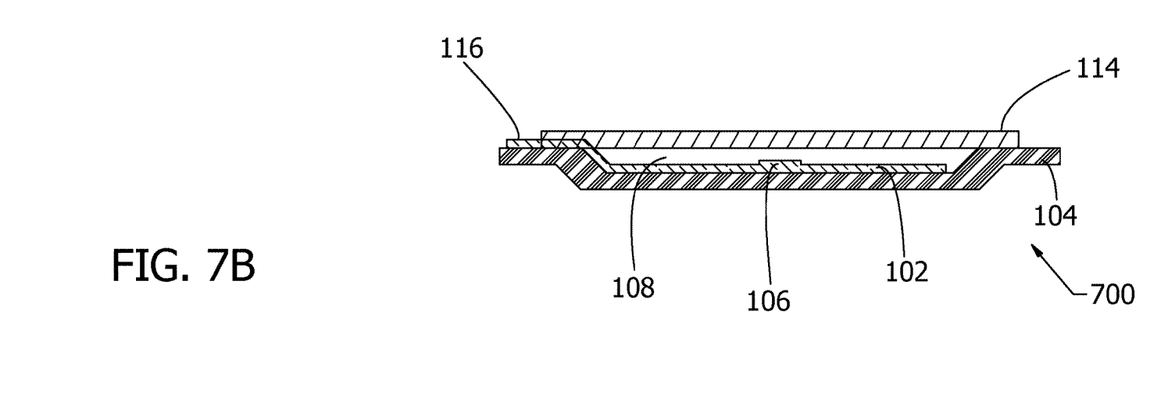
FIG. 7B illustrates a sectional view of the structure of FIG. 7A at cut line 7B-7B.

With reference now to FIGS. 7A-B, the RFID antenna structure 102 is shown with a base layer 114 that is smaller than the substrate 104 area of the plastic cavity 108 (shown in FIGS. 7A-B as 700), such that one or more of the extensions 116 of the RFID antenna structure 102 extend outside the base layer 114, creating a different coupling, dependent on the properties of the substrate 104.

Figure 8A:
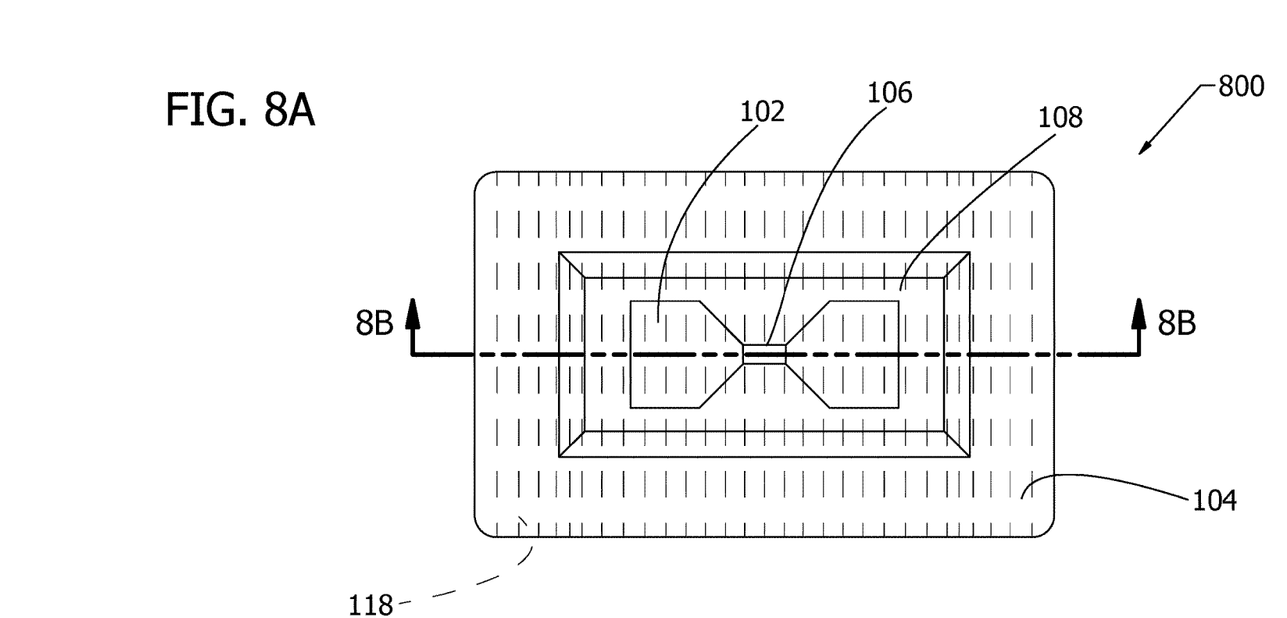
FIG. 8A illustrates a top perspective view of the RFID antenna structure wherein the thermoplastic substrate has corrugations in accordance with the disclosed architecture.
Figure 8B:
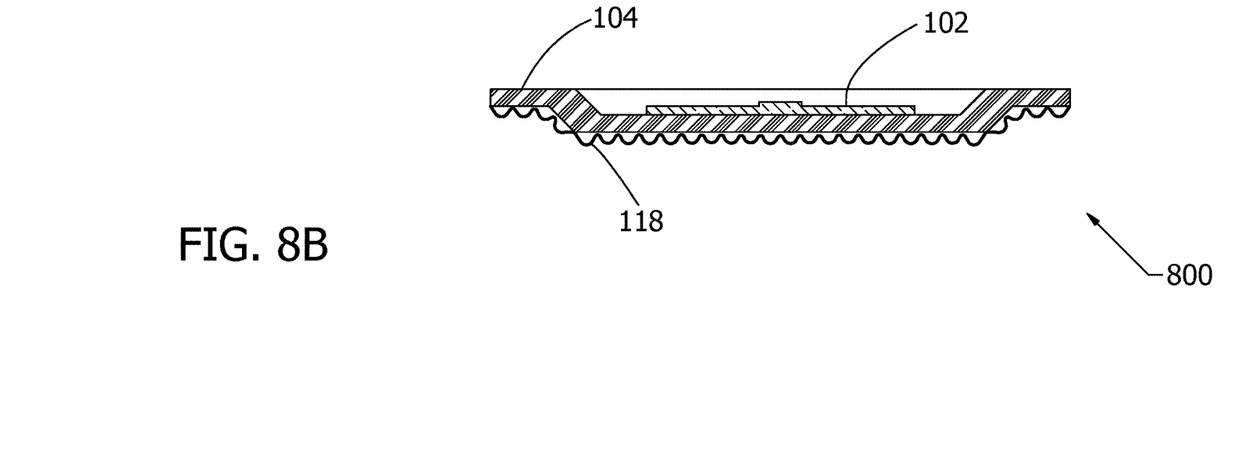
FIG. 8B illustrates a sectional view of the structure of FIG. 8A at cut line 8B-8B.

With reference now to FIGS. 8A-B, the RFID antenna structure 102 is shown with a corrugated substrate to allow the RFID tag 100 to better conform to curved surfaces (shown in FIGS. 8A-B as 800). The corrugations 118 allow bending of the substrate 104. The RFID antenna structure 102 can also be flexible or corrugated to allow for bending and to conform to curved surfaces.

Typically, the substrate carrying the RFID antenna structure 102 is vacuum formed, but alternative methods with different properties can also be utilized. For example, the substrate can be vacuum formed with the antenna conductor but without the RFID device, which is added after the cavity formation. This avoids mechanical stress associated with the forming being applied to the RFID device.

Further, the substrate can be vacuum formed to form a cavity, and an RFID inlay/label is applied to the inner or outer surface. In this way, both the antenna and RFID device are not exposed to the forming process. One advantage of this approach is using a label that, by applying the label to the outer surface, a printable surface is exposed.

In another embodiment, the RFID labels are encoded and printed on prior to application to the vacuum formed separator. Finally, the substrate of the RFID device can be made of a shape memory plastic, that is flat during processing but when an external factor such as heat or UV radiation is applied, creates the cavity type structure used for this device.

In a further embodiment, the RFID tag 100 is made by any of the means described herein in a cavity and incorporates the structure of an acousto-magnetic electronic article surveillance device as marketed by Tyco, Sensormatic®.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A (radio frequency identification) RFID tag designed to operate on difficult substrates, comprising:
   a thermoplastic substrate component;
   an RFID antenna structure formed on a side of the thermoplastic substrate component; and
   an RFID chip coupled to the RFID antenna structure; and wherein the substrate component is deformed into a cavity with the RFID antenna structure positioned within the cavity and a bottom surface of the cavity is covered with a base layer and the base layer is smaller than a rim area of the cavity such that an extension of the RFID antenna structure extends outside the base layer.

2. The RFID tag of claim 1, wherein the difficult substrate surfaces comprise dielectric surfaces with high loss, organic material surfaces, or metallic surfaces.

3. The RFID tag of claim 1, wherein the RFID antenna structure comprises a monopole, a dipole, a patch, or a slot antenna.

4. The RFID tag of claim 3, wherein the RFID antenna structure is formed from at least one of metal foil, copper, aluminum, a vapor deposited metal layer, and a conductive ink.

5. The RFID tag of claim 1, wherein the RFID antenna structure is formed on the thermoplastic substrate in a roll to roll process.

6. The RFID tag of claim 1, wherein the RFID antenna structure is positioned fully on a top surface of the cavity.

7. The RFID tag of claim 1, wherein the RFID antenna structure is positioned partially in a top and partially on an edge or bottom of the cavity.

8. The RFID tag of claim 1, wherein the base layer is a conductive material such as foil.

9. The RFID tag of claim 1, wherein a portion of the RFID antenna structure is extended onto a rim of the cavity.

10. The RFID tag of claim 1, wherein the RFID antenna structure is coupled at both ends to the substrate.

11. The RFID tag of claim 1, wherein the substrate component is a corrugated substrate to allow the RFID tag to better conform to curved surfaces.

12. A RFID tag designed to operate on difficult substrates such as dielectric surfaces with high loss, organic material surfaces, or metallic surfaces, comprising:
   a thermoplastic substrate component comprising a first side and a second side;
   an RFID antenna structure formed on the first side of the thermoplastic substrate component; and
   an RFID chip coupled to the RFID antenna structure; and
   a cavity formed on the second side of the thermoplastic substrate component;
   wherein the RFID antenna structure is positioned fully on a top surface or partially in a top and partially on an edge or bottom surface of the cavity and the bottom surface of the cavity is covered with a base layer and the base layer is smaller than a rim area of the cavity such that an extension of the RFID antenna structure extends outside the base layer.

13. The RFID tag of claim 12, wherein the RFID antenna structure comprises a monopole, a dipole, a patch, or a slot antenna.

14. The RFID tag of claim 12, wherein a portion of the RFID antenna structure is extended onto a rim of the cavity.

15. The RFID tag of claim 12, wherein the substrate component is a corrugated substrate to allow the RFID tag to better conform to curved surfaces.

16. A method of making an RFID tag designed to operate on difficult substrates, comprising:
   providing a thermoplastic substrate component with a first side and a second side;
   forming an RFID antenna structure on the first side of the thermoplastic substrate component such that the substrate component has at least one cavity with the antenna structure positioned within the at least cavity and the at least one cavity has a bottom surface and the bottom surface of the cavity is covered with a base layer and the base layer is smaller than a rim area of the at least one cavity such that an extension of the RFID antenna structure extends outside the base layer;
   coupling an RFID chip to the RFID antenna structure;
   placing the second side of the thermoplastic substrate component over an aperture;
   heating the thermoplastic substrate component to soften plastic surface;
   applying a vacuum to the thermoplastic substrate component;
   pulling material from the thermoplastic substrate component into the aperture; and
   forming a blister with the RFID antenna structure on the blister.

* * * * *